DONALD W. MORRIS
INVENTOR.

BY

Mellin and Hanscom
ATTORNEYS

Oct. 18, 1955  D. W. MORRIS  2,720,871
PISTON AND CONNECTING ROD ASSEMBLY
Filed June 23, 1952  2 Sheets-Sheet 2

DONALD W. MORRIS
INVENTOR.

BY
Mellin and Hanscom
ATTORNEYS

United States Patent Office

2,720,871
Patented Oct. 18, 1955

2,720,871

PISTON AND CONNECTING ROD ASSEMBLY

Donald W. Morris, Berkeley, Calif., assignor to Morris Development Company, Los Angeles, Calif., a copartnership Application June 23, 1952, Serial No. 295,017

2 Claims. (Cl. 123—41.38)

This invention relates to internal combustion engines and particularly to parts and assemblies thereof.

After assembly of an engine, the axis of a cylinder, considered in the plane containing the associated crankshaft, is frequently not square, i. e., exactly perpendicular, to the axis of the crankshaft. The above condition may be due to errors in machining, inaccurate assembly of parts, thermal or mechanical stresses in the parts, or for various other causes. The ordinary wrist pin connection between a piston and connecting rod permits no such condition as above described, and hence the parts must be scrapped, reassembled, or re-machined and re-assembled. This is expensive and the operations are time consuming.

A main object of the present invention is to provide an assembly comprising a piston and a connecting rod so oscillatably connected that the piston may readily run within and be guided by its cylinder, and the connecting rod may operate square with its crankshaft, although the axis of the cylinder, considered in a plane containing the axis of the crankshaft, is not square with the crankshaft axis.

Another object of the present invention is to provide a novel arrangement for cooling a piston and a novel arrangement for lubricating a piston and connecting rod assembly, particularly of the type just described above.

Various other objects of the present invention will be apparent from the following description taken in connection with the accompanying drawings, wherein.

Figures 1, 2:
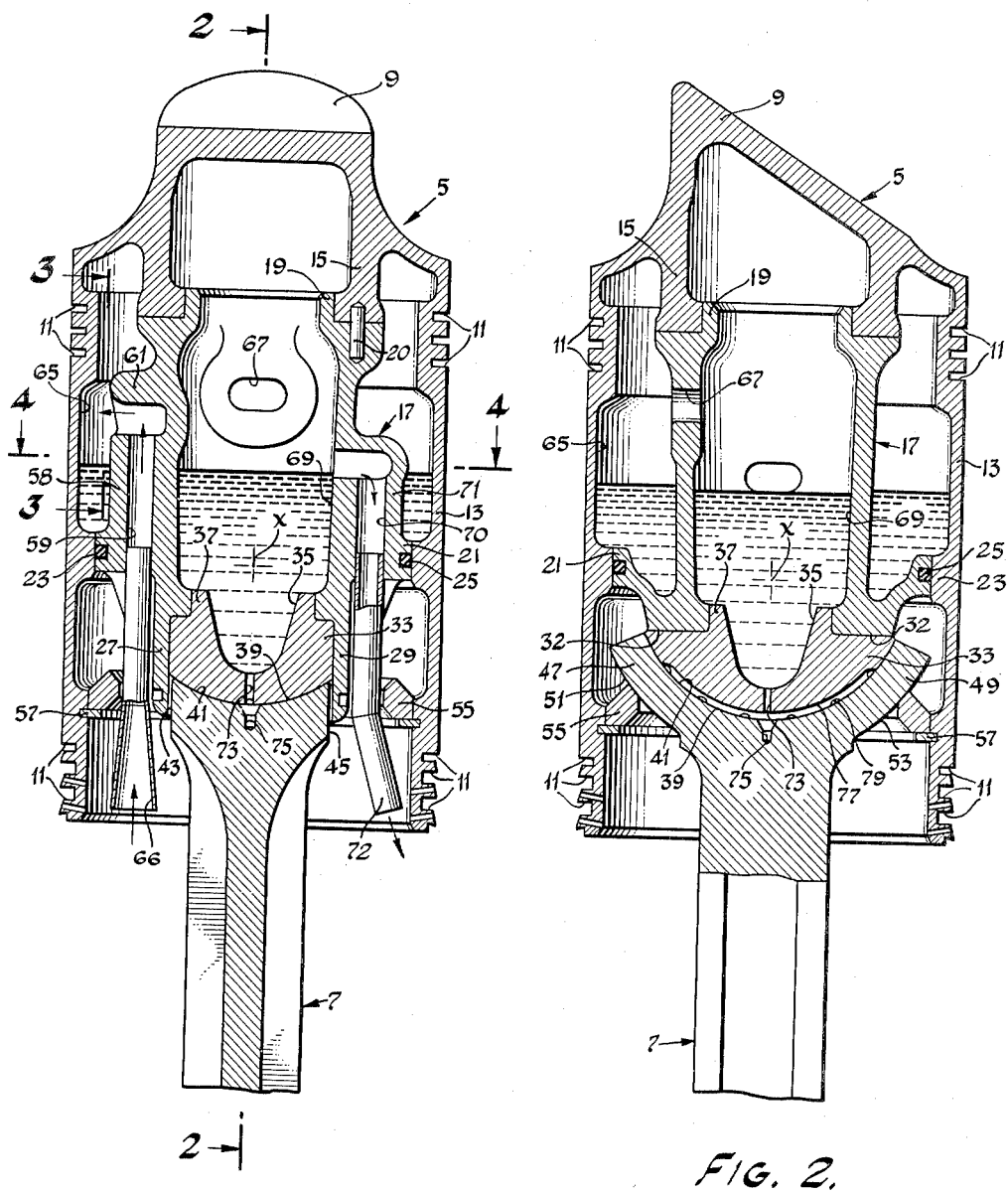
Fig. 1 is a vertical mid-section through a piston and connecting rod assembly embodying the concepts of the present invention, showing the cooling oil in the bottom of the piston cavities.
Fig. 2 is a vertical mid-section taken along lines 2—2 of Fig. 1.

Referring to the accompanying drawings wherein similar reference characters designate similar parts throughout, there is disclosed a composite piston generally entitled 5 having oscillatably connected thereto by a special ball and socket joint the piston end of a connecting rod 7. This joint will be presently described.

Piston 5 has a peaked crown 9, which is of no importance to the present invention, it being covered in my co-pending application entitled "Internal Combustion Engine Combustion Chamber," filed June 23, 1952, and bearing Serial No. 295,018. Piston 5 also has piston ring grooves 11 formed therein to receive piston rings.

Piston 5 comprises a hollow piston body 13 having internally formed therein a depending annular flange 15. Disposed within piston body 13 is a generally tubular insert 17 having at its top an annular centering step 19 fitting onto the lower end of flange 15. A suitable dowel 20, or several of said dowels, is provided for fixing the relative positions of the insert and the piston body.

Insert 17 has formed on its exterior a radial flange 21 fitting against a mating rib 23, formed on the interior of piston body 13. Flange 21 is grooved to receive an O ring seal 25 disposed in sealing engagement with rib 23.

At its lower end, insert 17 terminates in laterally spaced guide plate portions 27 and 29, each having a downwardly facing internally disposed shoulder 31, which shoulders merge into coplanar shoulders 32 provided by the bottom surface of radial flange 21, compared to Figs. 1 and 2. Neatly fitting between guide plate portions 27 and 29 and against shoulders 31 and 32, is a ball member 33 of the previously mentioned ball and socket joint.

Ball member 33 is centrally recessed at 35, for a purpose to be hereinafter described, and has an upwardly extending annular flange 37 fitting into the tubular portion of insert 17. The bottom face 39 of ball member 33 is formed convexly semispherical. The center of curvature of said face is disposed above the ball member at approximately point "X," which is the point through which the axis of a wrist pin would extend, if such were provided.

Fitting against the convex semi-spherical face 39, is a concave semi-spherical face 41 formed on the piston end of connecting rod 7. The just-mentioned end of said connecting rod is formed with flat sides 43 and 45 spaced slightly from the opposed faces of guide plate portions 27 and 29, and has laterally directed arcuate extensions 47 and 49. The outer faces 51 and 53 of such extensions are also formed concentrically semi-spherically and disposed in bearing engagement with a retainer 55. Retainer 55 is in the form of a continuous unbroken ring maintained in engagement with extensions 47 and 49 by a split snap ring 57, which fits within a groove formed on the interior of piston body 13. Ring 55 has an annular concentric semi-spherical surface for mating engagement with faces 51 and 53 of arcuate extensions 47 and 49.

The spacing of flat sides 43 and 45 with respect to the opposed faces of guide portions 27 and 29, i. e., the lateral fit of the piston end of connecting rod 7 with the guide plate portions, is such as to permit a predetermined limited angular adjustment of the piston and connecting rod relative to one another, in a plane containing the axes of the piston and crankshaft (to which the connecting rod is connected). The advantages of this construction will be presently set out.

Figure 3:
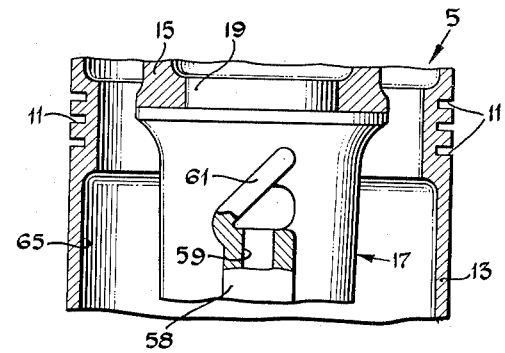
Fig. 3 is a fragmentary vertical sectional view taken along line 3—3 of Fig. 2 showing part of the cooling system.

Of immediate importance, however, is a novel cooling system for the assembly. Formed in flange 21 and in a boss 58 provided on the exterior of insert 17, parallel to the longitudinal axis of such insert, is a passage 59 (see Fig. 3).

Formed on the exterior of insert 17 is an oil deflector 61 for deflecting oil, that is jetted up (by means not shown) between ring 55 and guide plate portion 27 and through passage 59, right angularly into an annular cavity 65 provided between the exterior of insert 17 and the interior of piston body 13, and defined at its bottom by rib 23 and flange 21. A downwardly flared tubular scoop 66, fitting at its upper end into passage 59, may be provided for better directing the oil being jetted upwardly into passage 59.

Figure 5:
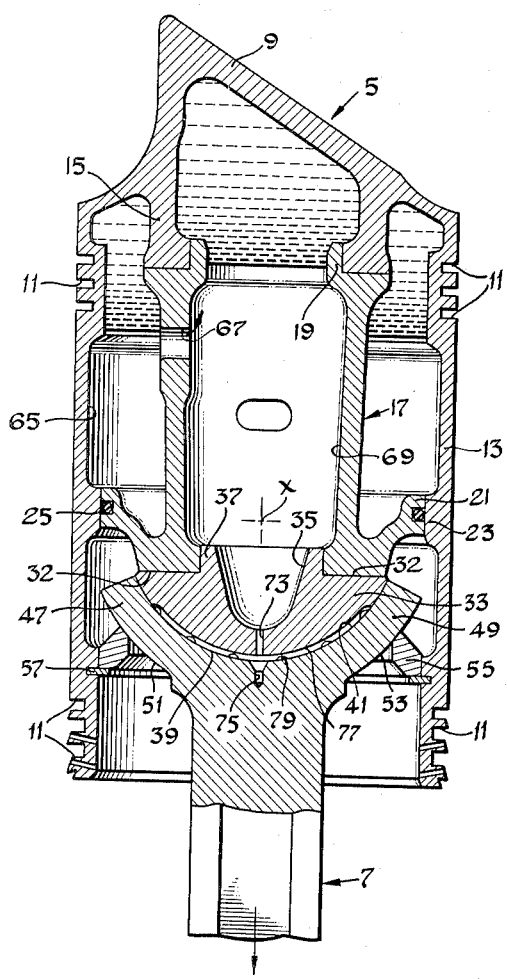
Fig. 5 is a view similar to Fig. 1, but showing the oil supply within the piston cavities being thrown against the interior of the crown of the piston.
Figure 4:
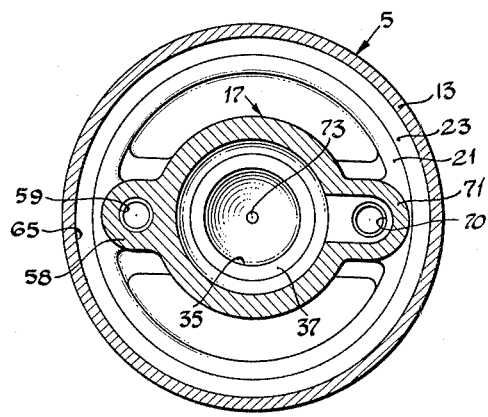
Fig. 4 is a cross-sectional view of the piston taken along line 4—4 of Fig. 1.

During reverse movement of the piston at the top of its stroke, oil, collecting in cavity 65, is adapted to be thrown from the bottom of said cavity, the position shown in Figs. 1 and 2, upwardly against the interior of the top of the piston, the position shown in Fig. 5, to collect heat from the top of the piston and, therefore, cool the same. The excess of such oil is forced, as best shown in Fig. 5, through openings 67, formed in the walls of insert 17, into a cavity 69 provided in the interior of said insert by the closing of the lower end thereof by ball member 33. The oil collected in this cavity is also thrown against the interior of the top of the piston, see Fig. 4, to cool the same. The excess oil flows out through a drain passage 70, formed in part in a boss 71 and flange 21, down past the exterior of guide portion 29 and between such guide portion and ring 55. An outlet drain tube 72, fitting within drain passage 70, may be provided for directing the oil in a predetermined direction so as to prevent it from falling onto the connecting rod bearing box (not shown). A shield (not shown) may be further provided, as an optional construction, to prevent oil falling on the bearing box.

Ball member 33 is formed centrally with a small vertical passage 73. Semi-spherical face 39 of ball member 33 is centrally grooved at 77 said groove intersecting passageway 73, and transversely grooved at 79, said transverse grooves intersecting central groove 77 to ensure proper lubrication of the ball and socket joint.

It is apparent from Fig. 1 that a predetermined limited misalignment of the longitudinal axis of the connecting rod relative to the longitudinal axis of the piston, in a plane perpendicular to the plane of oscillation of said rod, is permitted, yet with proper bearing contact being maintained between the rod and piston by the special ball and socket joint provided. Excessive misalignment is prevented by guide plate portions 27 and 29. The connecting rod is therefore free to align itself square with its crankshaft and the piston with its cylinder. It follows from the above, that variations in alignment of the cylinder and crankshaft axes, in a plane containing said axes, such as might result from machining tolerances, assembly variations, thermal and mechanical stresses, do not necessitate scrapping, or re-assembling or re-machining of the parts. Further, the spherical bearing provided has approximately 60% more area than a conventional pin bushing.

The novel cooling arrangement provided allows oil to be supplied by a jet issuing from means spaced from the cylinder. The spaces provided between ring 55 and guide plate portions 27 and 29 allow cooling oil to be jetted up into the piston and discharged from the piston in a manner not possible with a full diameter joint.

By the novel cavity arrangement within the piston, a supply of oil is entrapped and thrown against the interior of the piston crown to cool the same, and the oil is circulated through the piston to supply cooler oil and discharge hot oil. The oil deflector within the piston is so arranged that oil within the cavities is prevented from re-entering the oil supply passage.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In an internal combustion engine, a piston, a connecting rod oscillatably connected to the piston, said piston having a central chamber and surrounded by an outer annular chamber, a lubricant passageway extending upwardly in the piston past the connection between the rod and piston and communicating with the annular chamber at a place spaced from the bottom of said annular chamber, a second lubricant passageway connecting the chambers at a place entirely above the place of communication between the first-named passageway and the annular chamber, and a third lubricant passageway communicating with the central chamber at a place below both of the above-named places but above the bottom of the central chamber for conveying excess lubricant away from the central chamber, the first-named passageway opening into the annular chamber generally at right angles to the length of the piston, said third passageway extending down past the connection between the piston and rod, the volume of said annular chamber below the upper end of the first-mentioned passageway being greater than the volume of said annular chamber above said second lubricant passageway.

2. In an internal combustion engine, a piston, a connecting rod oscillatably connected to the piston, said piston having a central chamber and surrounded by an outer annular chamber, a lubricant passageway extending upwardly in the piston past the connection between the rod and piston and communicating with the annular chamber at a place from the bottom of said annular chamber, a second lubricant passageway connecting the chambers at a place entirely above the place of communication between the first named passageway and the annular chamber, and a third lubricant passageway communicating with the central chamber at a place below both of the above named places but above the bottom of the central chamber for conveying excess lubricant away from the central chamber, the first-named passageway opening into the annular chamber generally at right angles to the length of the piston, said third passageway extending down past the connection between the piston and rod, the volume of said annular chamber below the upper end of the first-mentioned passageway being greater than the volume of said annular chamber above said second lubricant passageway, and a fourth passageway communicating with the bottom of the central chamber and with the oscillatable connection between the piston and the connecting rod for lubricating said connection.

References Cited in the file of this patent

UNITED STATES PATENTS

| | | |
|---|---|---|
| 1,413,645 | Wiltse | Apr. 25, 1922 |
| 1,787,556 | Smith | Jan. 6, 1931 |
| 1,788,566 | Dock | Jan. 13, 1931 |
| 1,856,107 | Mellor | May 3, 1932 |
| 2,304,891 | Dickson | Dec. 15, 1942 |
| 2,621,638 | Chatterton | Dec. 16, 1952 |